(12) United States Patent
Chen

(10) Patent No.: US 12,384,701 B2
(45) Date of Patent: Aug. 12, 2025

(54) ION REMOVAL DEVICES BASED ON ELECTROCHEMISTRY AND PHOTO-ELECTROCHEMISTRY, AND PREPARATION METHOD AND APPLICATION

(71) Applicant: SOUTH CHINA NORMAL UNIVERSITY, Guangzhou (CN)

(72) Inventor: Fuming Chen, Guangzhou (CN)

(73) Assignee: SOUTH CHINA NORMAL UNIVERSITY, Guangzhou (CN)

( * ) Notice: Subject to any disclaimer, the term of this patent is extended or adjusted under 35 U.S.C. 154(b) by 1112 days.

(21) Appl. No.: 17/629,794

(22) PCT Filed: Mar. 27, 2019

(86) PCT No.: PCT/CN2019/079827
§ 371 (c)(1),
(2) Date: Jan. 25, 2022

(87) PCT Pub. No.: WO2019/184939
PCT Pub. Date: Oct. 3, 2019

(65) Prior Publication Data
US 2023/0013770 A1     Jan. 19, 2023

(30) Foreign Application Priority Data

Mar. 28, 2018  (CN) .......................... 201810261936.8
Mar. 30, 2018  (CN) .......................... 201810294845.4
(Continued)

(51) Int. Cl.
C02F 1/46       (2023.01)
C02F 1/26       (2023.01)
(Continued)

(52) U.S. Cl.
CPC .......... *C02F 1/46109* (2013.01); *C02F 1/265* (2013.01); *C02F 1/42* (2013.01);
(Continued)

(58) Field of Classification Search
CPC ........ C02F 1/46109; C02F 1/265; C02F 1/42; C02F 2001/46133; C02F 2103/08;
(Continued)

(56) References Cited

U.S. PATENT DOCUMENTS

| | | | |
|---|---|---|---|
| 9,214,695 B2 | 12/2015 | Wang et al. | |
| 2004/0023010 A1* | 2/2004 | Bulovic | H05B 33/14 428/209 |

(Continued)

FOREIGN PATENT DOCUMENTS

| | | |
|---|---|---|
| CN | 1313645 A | 9/2001 |
| CN | 101567459 A | 10/2009 |

(Continued)

OTHER PUBLICATIONS

Mauro Pasta, et al., A Desalination Battery, Nano Letters, 2012, pp. 839-843, vol. 12.
(Continued)

*Primary Examiner* — Waqaas Ali
(74) *Attorney, Agent, or Firm* — Bayramoglu Law Offices LLC

(57) ABSTRACT

An ion removal device based on electrochemical and photoelectrochemical methods, and the application of energy conversion and storage are provided. In the ion removal process based on the electrochemical and photoelectrochemical fluidization battery device, the positive active material in the flow battery is the positive pole of device, the negative active material in the fluid battery is the negative pole of the device, and the salt solution is the electrolyte in the middle stream. The positive and negative active mate-
(Continued)

rials include organic materials such as 4-hydroxy-piperidinol oxide, riboflavin sodium phosphate or methyl viologen, which have the advantages of low raw material cost, environmental friendliness, high sustainability, excellent electrochemical performance, high specific capacity and good cycle stability etc. The electrolyte can be separated from the positive and negative active liquid flow materials according to the fixed sequence of self-assembly of fluid battery mold.

8 Claims, 13 Drawing Sheets

(30) Foreign Application Priority Data

| | | |
|---|---|---|
| May 17, 2018 | (CN) | 201810473562.6 |
| Nov. 22, 2018 | (CN) | 201811400339.5 |
| Jan. 30, 2019 | (CN) | 201910093085.5 |

(51) Int. Cl.
  *C02F 1/42* (2023.01)
  *C02F 1/461* (2023.01)
  *C02F 103/08* (2006.01)

(52) U.S. Cl.
  CPC .......... *C02F 2001/46133* (2013.01); *C02F 2103/08* (2013.01); *C02F 2201/46115* (2013.01); *C02F 2201/46165* (2013.01); *C02F 2305/10* (2013.01)

(58) Field of Classification Search
  CPC .. C02F 2201/46115; C02F 2201/46165; C02F 2305/10; C02F 2101/20; C02F 1/4695; C02F 2201/46185; C02F 2305/08; C02F 3/00; Y02E 60/10; Y02E 60/50; H01M 4/58; H01M 8/18
  See application file for complete search history.

(56) References Cited

U.S. PATENT DOCUMENTS

2012/0266959 A1* 10/2012 Hong ................ H01G 9/2031
  977/734

2022/0135442 A1* 5/2022 Bawendi ................ B01J 39/14
  210/638

FOREIGN PATENT DOCUMENTS

| | | | | |
|---|---|---|---|---|
| CN | 103109336 A | | 5/2013 | |
| CN | 103401045 A | | 11/2013 | |
| CN | 103594716 A | | 2/2014 | |
| CN | 103606458 A | | 2/2014 | |
| CN | 104916884 A | | 9/2015 | |
| CN | 105336952 A | | 2/2016 | |
| CN | 106057477 A | | 10/2016 | |
| CN | 106298263 A | | 1/2017 | |
| CN | 106904728 A | * | 6/2017 | .......... C02F 1/46109 |
| CN | 107913723 A | * | 4/2018 | .............. B01J 27/25 |
| CN | 108483573 A | | 9/2018 | |
| CN | 108493501 A | | 9/2018 | |
| CN | 108675404 A | | 10/2018 | |
| CN | 109216742 A | | 1/2019 | |
| WO | 2015148358 A1 | | 10/2015 | |

OTHER PUBLICATIONS

Xiangyu Zhao, et al., Chloride ion battery: A new member in the rechargeable battery family, Journal of Power Sources, 2014, pp. 706-711, vol. 245.

Xiangyu Zhao, et al., Metal Oxychlorides as Cathode Materials for Chloride Ion Batteries, Angew. Chem. Int. Ed., 2013, pp. 13621-13624, vol. 52.

Akihiro Orita, et al., A biomimetic redox flow battery based on flavin mononucleotide, Nature Communications, 2016, pp. 1-8, 7:13230.

Fuming Chen, et al., A dual-ion electrochemistry deionization system based on AgCl-Na0.44MnO2 Electrodes, Electronic Supplementary Material (ESI) for Nanoscale, 2017, pp. 1-11.

Liu Jing Jia, et al., TEMPO and Its Derivatives in Organic Redox-Flow Batteries, (Daxue Huaxue) Univ. Chem, 2017, pp. 32-44, vol. 32, No. 11.

Hezhen Wu, Nanotechnology and Environmental Protection, 2013, pp. 116-119, Hefei University of Technology Press.

Ruifa Zhou, Nanomaterials Technology, 2003, pp. 481-484, National Defense Industry Press.

* cited by examiner

ION REMOVAL DEVICES BASED ON ELECTROCHEMISTRY AND PHOTO-ELECTROCHEMISTRY, AND PREPARATION METHOD AND APPLICATION

CROSS REFERENCE TO THE RELATED APPLICATIONS

This application is the national phase entry of International Application No. PCT/CN2019/079827, filed on Mar. 27, 2019, which is based upon and claims priority to Chinese Patent Applications No. 201810261936.8, filed on Mar. 28, 2018, No. 201810294845.4, filed on Mar. 30, 2018, No. 201810473562.6, filed on May 17, 2018, No. 201811400339.5, filed on Nov. 22, 2018, and No. 201910093085.5, filed on Jan. 30, 2019, the entire contents of which are incorporated herein by reference.

TECHNICAL FIELD

The invention belongs to the technical field of electrochemical deionization, and specifically relates to an ion removal device based on electrochemistry and photo-electrochemistry, and a preparation method and application thereof.

BACKGROUND

Due to the drastic climate change, the shortage of freshwater resources has recently become one of the key crises for human survival and many people lack water because of the depletion of freshwater resources. The ocean is an infinite source of water, and its water content accounts for 97.5% of the earth's total water content. Therefore, desalination is a practical method to obtain usable water. Removal of excessive salt from seawater is the most critical step in the desalination process. Reverse osmosis (RO), electrodialysis and thermal distillation have been widely used in the industrialization and commercialization of desalination in recent years, but it requires a large amount of capital investment and high operating costs. Capacitive deionization (CDI) technology has been developed as an energy-saving and economical technology for desalination. A conventional CDI device consisting of two capacitive electrodes, such as high surface area porous carbon which removes salt ions through electrostatic interaction. However, due to the limited electrostatic capacitance from the electric double layer and low salt removal ability, the CDI technology is not practical for high-concentration salt feed. Since then, Mantia et al. proposed the concept of battery desalination in 2012 to improve desalination capabilities. Due to the capacity limitation of electrode materials, especially chloride ion electrochemical materials, the related research has stalled. Recently, water-containing chloride-ion batteries and dual-ion Faraday electrochemical deionization systems have been proposed, which can potentially increase ion trapping capability. This method advances the research on battery desalination. And many battery-based deionization designs have been proposed, including rocking chair desalination using electrostatic electrode materials, as well as various battery desalination devices and even redox flow battery systems.

The increasing demand for water and energy saving requires the development of new desalination technologies, which possess the advantages of lower energy consumption, higher deionization capabilities, lower costs, abundant resources and environmental-friendly characteristics.

Increasing energy demand and environmental factors have forced the further development of new energy power generation and new energy storage, which have the main characteristics of high energy density, safety, environmental protection, reliability and sustainability. Rechargeable battery systems including lithium-ion batteries, sodium-ion batteries, lead-acid batteries, nickel-hydrogen batteries, and hydrogen fuel cells have been paid a lot of research attention, and they have been practically applied in various fields. However, almost all researches have focused on the cationic battery system. This is because anion electrochemical energy storage technology has become a hot research topic due to the transport performance of anion ions. For example, Maximilian Fichtner et al. proposed the concept of a chloride-ion battery system, and developed ionic liquids or organic solvent electrolytes by several research teams. For the selected electrode electrochemical pair, the theoretical energy density is as high as 2500 Wh L$^{-1}$. Recently, the design of an aqueous chloride solution battery has been realized in an aqueous NaCl solution with BiOCl as the anode and Ag as the cathode. When operating at a current density of 400 mA/g, a stable and reversible capacity of 92.1 mAh g$^{-1}$ can be obtained in 45 cycles. Compared with chloride, fluorine is the first element in the halogen table. The radius of fluoride ions is much smaller, which facilitates rapid ion transport and kinetic diffusion. The fluoride ion battery system has proved in pioneer work. However, achieving functional fluoride ion transport in aqueous electrolyte solutions is still a challenge because most electrode materials are unstable or soluble in aqueous electrolyte solutions.

SUMMARY

The purpose of the present invention is to provide a method for desalination using a flow battery and its application.

Another purpose of the present invention is to provide a preparation method of sodium fluoride dual-ion battery and its application in electrochemical fluoride ion removal.

Another purpose of the present invention is to provide a method and application for continuous low-energy desalination using the redox reaction of a flow battery.

Another purpose of the present invention is to provide a method for continuous low energy consumption desalination using material electrochemistry.

Another purpose of the present invention is to provide a light-driven electrochemical catalytic continuous desalination method and the relevant flow desalination battery device.

The technical scheme of the present invention is as follows:

The method for desalination using a flow battery is to use a flow desalination battery device; specifically, the desalination battery device uses a positive electrode active material as the positive electrode of the flow battery, the negative electrode active material as the negative electrode of the flow battery, and a salt solution as the intermediate flow electrolyte of flow battery.

The positive electrode active material includes the organic material, inorganic material, organic solution or inorganic solution; the organic material includes 4-Hydroxy-piperidinol oxide (4-Hydroxy-TEMPO), Riboflavin-5'-phosphate sodium salt dihydrate or Methyl viologen dichloride hydrate, preferably 4-hydroxy-piperidinol oxide; the inorganic material includes VCl$_3$ or NaI; the inorganic solution contains $Br_2/Br^-$, $VO^{2+}/VO^{2+}$, $V^{3+}/VO^{2+}$, $Fe^{3+}/Fe^{2+}$, $Ce^{3+}/Ce^{4+}$, $Ti^{3+}/Ti^{4+}$, or $Ce^{3+}/Ce^{2+}$.

The negative electrode active material includes the organic material, inorganic material, organic solution or inorganic solution; the inorganic material includes $VCl_3$, NaI, Zn or Pb; the inorganic solution contains $V^{3+}/V^{2+}$, $Cr^{3+}/Cr^{2+}$, $Cu^{2+}/Cu^+$, $TiOH^{3+}/Ti^{3+}$, $Cr^{3+}/Cr^{2+}$, $S/S^{2-}$, $Ti^{3+}/Ti^{2+}$, $Mn^{2+}/Mn^{3+}$, or $I^{3-}/I^-$.

The salt solution includes sodium chloride solution, sea water, or contains heavy metals/metalloid elements; The anion exchange membrane is an ion exchange membrane containing —NH2 (amino), —N(CH3)3OH (quaternary amine group) and other functional groups; or a chloride ion exchange membrane, a fluoride ion exchange membrane, or a sulfate ion exchange membrane, Nitrate ion exchange membrane, etc.; preferably an anion exchange membrane containing quaternary amine groups; The cation exchange membrane is an ion exchange membrane containing functional groups such as —COOH (carboxyl) and —SO3H (sulfonic acid group); or sodium ion exchange membrane, lithium ion exchange membrane, potassium ion exchange membrane, calcium (Ca) ion Exchange membranes, magnesium (Mg) ion exchange membranes, etc.; preferably cation exchange membranes containing sulfonic acid groups.

The flow desalination battery device is prepared by the following method:
(1) Dissolve the inorganic salt in the solvent and stir evenly to obtain a salt solution;
(2) Dissolving the positive electrode active material into the salt solution obtained in step (1) to obtain the positive electrode material electrolyte;
(3) Dissolving the negative electrode active material into the salt solution obtained in step (1) to obtain the negative electrode material electrolyte;
(4) Assemble the flow battery device in a fixed sequence of self-assembly of the flow battery device mold: Use the salt solution obtained in step (1) as an intermediate fluid electrolyte, and the positive electrode material electrolyte obtained in step (2), the negative electrode material electrolyte obtained in step (3), carbon paper, anion exchange membrane, and cation exchange membrane are assembled into a flow desalination battery device.

Specifically, the concentration of the salt solution in step (1) is 200 mg/L-50 g/L; the concentration of the cathode material electrolyte in step (2) is 0.005-10 mol/L;

The volume ratio of the intermediate flow electrolyte, the positive electrode material electrolyte and the negative electrode material electrolyte in step (4) is 1-100:1-50:1-50; the carbon paper is cleaned with a surface treatment agent followed by drying; the surface treatment agent is 4% to 5% (w/w) hydrochloric acid and absolute ethanol; the cleaning method is ultrasonic cleaning; the drying condition is at 50-60° C. for 1~2 h;

The anion exchange membrane described in step (4) contains quaternary amine groups, preferably a homogeneous anion exchange membrane containing quaternary amine groups; the cation exchange membrane contains sulfonic acid groups, preferably a homogeneous cation exchange membrane containing sulfonic acid groups;

The fixed sequence of the self-assembly of the flow battery device mold in step (4) is: starting from the negative electrode, placing the mold, carbon cloth strip, carbon paper, mold, carbon foam, cation exchange membrane, mold, anion exchange membrane, carbon foam, mold, carbon paper, carbon cloth strip, mold.

A method of desalination using flow batteries can be applied in the field of seawater desalination, fluoride ions removal or toxic ions (heavy metal ions) removal.

The present invention also provides a method for continuous low-energy desalination using the redox reaction of a flow battery, which is to remove salt ions through a flow desalination battery device; specifically, the flow desalination battery device uses positive and negative active flow materials as the positive and negative electrodes of the flow battery, and uses salt solution as the electrolyte of the flow battery; The positive and negative active flow materials include Ag/AgCl mixed solution, $Na_{0.44}MnO_2$ mixed solution, Bi/BiOCl, Sb/SbOCl, $K_{0.27}MnO_2$, $Na_2FeP_2O_7$, $V_2O_5$, $Na_3V_2(PO_4)_3$, $Na_2V_6O_{16}$, $NaTi_2(PO_4)_3$, polytetrafluoroethylene, polybutyl acrylate, $Na_2C_8H_4O_4$, polyvinyl alcohol, $Na_{0.44}[Mn_{1-x}Ti_x]O_2$, $BiF_3$, Pb, $PbF_2$, more than one of piperidine inorganic substances and bipyridinium salts; also include more than one of polyamide, Prussian blue $Fe_4[Fe(CN)_6]_3$ and manganese oxide.

The positive and negative active flow materials also include auxiliary conductive additives, which are more than one of carbon nanotubes, graphene, activated carbon and carbon black.

The flow desalination battery device also includes an isolation device for isolating the salt solution and the positive and negative active flow materials; the salt solution includes NaCl solution, NaF solution, domestic water, industrial sewage, seawater or contains toxic ions.

The volume ratio of the positive and negative active flow materials to the salt solution is 1:0.1-280.

The Ag/AgCl mixed solution is prepared by the following method: Ag particles, AgCl particles and activated carbon are added to deionized water, and then the obtained mixed solution is ball milled to obtain an Ag/AgCl mixed solution; The molar ratio of the Ag particles and AgCl particles is 1:1; The total mass ratio of activated carbon to Ag/AgCl is 3:7, where the total mass of Ag/AgCl is the total mass of Ag particles and AgCl particles; the conditions of the ball milling are: 2000-3000 r ball milling for 5-10 hours.

The Ag particles are prepared by the following methods: (1) adding carboxylated carbon nanotubes into deionized water, and ultrasonically disperse them uniformly to obtain mixed solution A; (2) adding AgNO3 to the mixed solution of step (1) in A, stir to mix evenly to obtain mixed solution B; (3) Add the NaBH4 solution dropwise to the mixed solution B of step (2), continue to stir after the dropwise addition to make it evenly mixed, centrifuge and rinse to obtain Ag particles; AgCl particles are prepared by the following method: (I) adding carboxylated carbon nanotubes to deionized water, ultrasonically disperse them uniformly to obtain mixed solution D; (II) adding AgNO3 to the mixed solution of step (I) in D, stir to mix uniformly to obtain mixed solution E; (III) Add the NaCl solution dropwise to the mixed solution E of step (II), continue to stir after the dropwise addition to make it evenly mixed, centrifuge and rinse to obtain AgCl particles.

The salt solution includes NaCl solution. NaF solution, domestic water, industrial sewage, sea water and other solutions containing toxic ions (such as containing copper, lead, zinc, iron, cobalt, nickel, manganese, cadmium, mercury, tungsten, Molybdenum, gold, silver, mercury, lead, cadmium and other metal ions).

The flow desalination battery device also includes an anion exchange membrane and a cation exchange membrane; the anion exchange membrane contains quaternary amine groups; the cation exchange membrane contains sulfonic acid groups.

The flow desalination battery device is prepared by the following method:

The assembly is carried out according to the fixed sequence of the self-assembly of the flow battery mold. Specifically, the salt solution is used as the intermediate flow electrolyte, and the positive and negative active flow materials, graphite paper, anion and cation exchange membranes are assembled to form a flow desalination battery device.

The volume ratio of the positive and negative active flow materials to the salt solution is 1:0.1-280; preferably 1:3-5.

The fixed sequence of the flow battery device mold self-assembly is: starting from the negative electrode, placing mold A, carbon cloth strip, graphite paper, carbon cloth, mold B, cation exchange membrane, mold C, anion exchange membrane, mold B, carbon cloth, graphite paper, carbon cloth strip, mold A.

The described method for continuous low-energy desalination using flow batteries is applied in the field of seawater desalination.

Through the electrochemical test, the Ag/AgCl mixed solution is used as the positive and negative active flow material; the NaCl solution as the electrolyte is combined with the flow battery through the redox reaction to charge and discharge, showing low energy consumption, high specific capacity, and electrochemical performance of good cycling. On the other hand, a conductivity meter is connected with this flow device, and an ion detector is used to detect the removal ability of NaCl ions. A significant salt removal ability can be detected, and the salt removal rate is as high as 175 mg/L (Ag/AgCl volume).

The present invention also provides a method for photo-driven electrochemical catalysis and continuous desalination. Conductive glass with photosensitive semiconductor material is used as a device for photoelectrochemical catalysis. Under illumination conditions, photoelectrons are generated to drive the desalination reaction. Exchange method of continuous desalination, that is, the electrochemical oxidation-reduction reaction of positive and negative electrode materials is driven by the light-sensitive semiconductor material to generate electron-hole pairs, and the isolation device is used for continuous desalination of ion exchange; The light source includes sunlight, laser, arc lamp, flash lamp, plasma lamp, Xe lamp, etc.; Among them, the negative electrode of the flow desalination battery device adopts conductive glass with photosensitive semiconductor material, and the flow desalination battery device uses the oxidation chamber and the reduction chamber of the same electrode active material as the positive and negative electrodes, and the oxidation chamber and the reduction chamber are connected by hoses; Photosensitive semiconductor materials include dye semiconductors, quantum dot semiconductors, elemental semiconductors, inorganic compound semiconductors, organic compound semiconductors, amorphous semiconductors and liquid semiconductors. Among them, the dye semiconductor Dyenamo red (red dye produced by the Swedish company Dyenamo) is more preferred; It also includes two-dimensional semiconductor materials, including $MoS_2$ and $MoSe_2$; The photosensitive semiconductor may be one of a solid phase, a liquid phase, or a solution phase.

The materials of the liquid phase or the solution phase include, but are not limited to, Azure C, thionine, azure A, azure B, methylene blue and other substances that have light reduction or light oxidation.

Conductive glass is used as a light window, including but not limited to ITO, FTO, etc.; a dense layer of semiconductor material is coated on the surface of conductive glass. The dense layer of semiconductor includes $TiO_2$, $ZnO$, $SrTiO_3$, $Co_3O_4$, $CuO$, $ZnS$, $SiC$, $Cu_2O$, $BaTiO_3$, $Bi_2O_3$, $Sb_2S_3$, $ZnSe$, $PtTe_2$, $WTe_2$, $MoTe_2$, $SnS_2$, $Bi_4Ti_5O_{12}$, $BiOI$, $Bi_2WO_6$, $Fe_2O_3$ and $WO_3$.

The conductive glass with photosensitive semiconductor material is preferably prepared by the following method:

(A) Wash FTO or ITO glass with 2% mass fraction detergent solution, deionized water, alcohol, and acetone in sequence;

(B) Prepare a transition layer on the FTO or ITO glass pretreated in (a) (dissolve 1.5 ml isopropyl titanate in 20 ml alcohol to make a mixed solution, spin coating at a speed of 1500 r/min 1 min, then put the coated FTO glass in a muffle furnace and heat it at 450° C. for 30 minutes);

(C) Mix and grind 0.6 g TiO2 powder, 0.1 g PEG, 0.1 g PEO, 0.5 ml acetylacetone, and a few drops of TritonX 100 in a mortar, then dilute to 5 ml with distilled water, then sonicate for 30 min, stir overnight, and coat On the glass obtained in (b), finally heat it at 150° C., 300° C., 450° C., 500° C. for 10 min, 15 min, 10 min, 30 min;

(D) Put the FTO glass obtained in (c) into a 40 mmol/L TiO2 solution and treat it at 70° C. for 30 minutes, and then heat the treated glass at 500° C. for 1 hour;

(E) Dissolve the LEG4 dye in acetonitrile to prepare a 0.2 mmol/L dye solution, then put the glass in (d) into this solution and soak for 12 to 14 hours, then take it out, wash it with alcohol, and you can prepare the desired Photosensitive semiconductor materials.

The isolation device separates the salt solution and the positive and negative active materials in the battery device, and includes an anion exchange membrane, a cation exchange membrane and a quantitative filter paper. The anion exchange membrane contains a quaternary ammonium group, and the cation exchange membrane contains sulfonic acid groups, the pore size of the quantitative filter paper is 0.10-20 μm; Among them, the salt solution includes NaCl, NaBr, domestic sewage, industrial sewage, sea water or sewage containing heavy metal ions; Positive and negative electrode active materials include TEMPO (2,2,6,6-tetramethylpiperidine-nitrogen-oxide), carbon nanotube-TEMPO, graphene-TEMPO, graphene oxide-TEMPO, Polymer-TEMPO, Methyl viologen dichloride hydrate, Riboflavin-5'-phosphate sodium salt dehydrate, Ag/AgCl solution, $LiCoO_2$, $LiMn_2O_4$, Bi/BiOCl, Sb/SbOCl, $LiMn_2O_4/NaTi_2(PO_4)_3$, $Zn/VS_2$, $Fe(CN)_6$, $K_{0.27}MnO_2$, $Na_2FeP_2O_7$, $V_2O_5$, $Na_3V_2(PO_4)_3$, $Na_2V_6O_1$, $Na_{0.44}MnO_2$, $NaTi_2(PO_4)_3$, PTFE (polytetrafluoroethylene) Ethylene), PBA (polybutyl acrylate), $Na_2C_8H_4O_4$, PVA (polyvinyl alcohol), $Na_{0.44}[Mn_{1-x}Ti_x]O_2$, Bi, $BiF_3$, Pb, $PbF_2$, piperidine inorganic substances and one or more than one of bipyridinium salts, where x in $Na_{0.44}[Mn_{1-x}Ti_x]O_2$ is less than 1; also includes one or more of polyamide, manganese oxide and Prussian blue $Fe_4[Fe(CN)_6]_3$; Among them, TEMPO is more preferred, and the preparation method of TEMPO solution includes any of the following methods:

(1) Add TEMPO powder and NaCl particles to deionized water to obtain a mixed solution, and ultrasonicate the resulting mixed solution to obtain a TEMPO mixed solution. The molar ratio of TEMPO particles to NaCl particles is 1:X (0<X<100).

(2) Add the TEMPO particles directly to deionized water, and sonicate the TEMPO solution to obtain the TEMPO solution.

The described ultrasonic conditions: 40 KHZ~100 KHZ ultrasonic 0.5-8 h;

The salt solution is NaCl, NaBr, domestic sewage, industrial sewage, sea water or sewage containing heavy metal ions;

The volume ratio of the positive and negative active materials to the salt solution is 1:0.001-20000;

In the present invention, all piperidine inorganic substances include 2-hydroxypyrimidine, and bipyridinium salts include 4'-dipyridinium salt dichloride;

According to different functions, the flow desalination battery device can be prepared in one of the following three ways:

Assemble according to the fixed order of the flow battery mold self-assembly, the order is: conductive glass with photosensitive semiconductor material, photo-negative active flow material or filter paper, anion exchange membrane, salt solution, cation exchange membrane or filter paper, positive active flow material, graphite paper;

Assemble according to the fixed sequence of flow battery mold self-assembly, the sequence is: conductive glass with photosensitive semiconductor material, photo-negative active flow material or filter paper, anion exchange membrane, salt solution 1, cation exchange membrane or filter paper, salt solution 2. Anion exchange membrane, positive active flow material, graphite paper;

Assemble according to the fixed sequence of the flow battery mold self-assembly, the sequence is: conductive glass with photosensitive semiconductor material, photo-negative active flow material or filter paper, anion exchange membrane, alternate layered with two salt solutions as the intermediate flow electrolyte, The outermost positive and negative electrodes, graphite paper, and several anion exchange membranes and cation exchange membranes that are connected with the positive and negative active flow materials are alternately assembled into a flow desalination battery device;

The salt solution channels and electrolyte channels in the above devices contain ion exchange resins, conductive ions, conductive carbon materials, and conductive polymers to increase electrical conductivity and reduce energy consumption.

The sodium ion electrode material is a positive electrode/anode material, and the negative ion electrochemical material is a negative electrode/cathode material, which is the same material as the positive electrode active material, the negative electrode active material, the positive and negative electrode active flow materials, and the active flow material. Additives and auxiliary conductive additives are also denoted as the same material.

The beneficial effects of the present invention are as follows:

(1) The positive and negative materials used in the present invention are organic compounds, the cost of organic active materials is low, environmentally friendly, and high sustainability; the electrochemical performance of the organic active material fluid battery test is excellent, and the first charge and discharge efficiency is high. It can effectively remove cations and anions, and achieve the purpose of desalination; it can provide good cycling performance during discharge and high specific capacity (up to 7800 mAh/g for the first time); the desalination method is simple, low-cost, and environmentally friendly. It has practical application benefits in seawater desalination.

(2) The Ag/AgCl mixed solution of the positive and negative active flow materials of the present invention is prepared. By using a nano ball mill and deionized water as a carrier, Ag, AgCl, and activated carbon are milled at nanometer level. The Ag/AgCl mixed solution exhibits electrical properties. The advantages of excellent chemical performance, high specific capacity, good cycle stability and low energy consumption. Compared with traditional desalination technology, it provides an innovative desalination concept, which is based on the principle of battery chemical reaction and uses positive and negative electrode materials for desalination. This technology can not only remove NaCl ions and provide electrical energy, but also has very low energy consumption.

(3) The negative electrode of the flow battery of the present invention adopts conductive glass with photosensitive semiconductor material, generates electron holes under light conditions, drives the desalination reaction, and solves the problem of energy consumption in the desalination process; the same electrode active material is used, The oxidation chamber and the reduction chamber are connected by the same hose, so that the positive and negative active solutions are recycled and used repeatedly; the used positive and negative active materials are low in cost, environmentally friendly, and highly sustainable, and are in line with a new generation of high-performance green Environment-friendly desalination concept; the method of continuous desalination using photochemical catalytic oxidation-reduction reaction is applied in seawater desalination, industrial wastewater treatment, domestic water purification, and photovoltaic energy conversion and storage.

DETAILED DESCRIPTION OF THE EMBODIMENTS

Examples

Non-limiting examples of the invention will be further described in greater detail by reference to specific Examples, which should not be construed as in any way limiting the scope of the invention.

Example 1

(1) A device for desalination using a fluid battery and its preparation method: (1) First cut carbon paper, homogeneous anion exchange membrane with quaternary amine groups and homogeneous cation exchange membrane with sulfonic acid groups into 11*11 cm The square shape is consistent with the mold size of the fluid battery device (11*11*cm), and then the carbon paper and the anion and cation exchange membranes are punched to fix the device with screws, which helps to maintain pressure during the reaction and prevent Materials contaminate each other. Then put the cut carbon paper into a 1000 ml beaker, and first pour 150 ml of 4% (w/w) hydrochloric acid into ultrasound for 5 minutes, with an ultrasound power of 200 W. Subsequently, the hydrochloric acid was poured out, rinsed with deionized water, and then poured into 150 ml of absolute ethanol and ultrasonicated for 5 min (power 200 W). Finally, the absolute ethanol was poured out, rinsed with deionized water, and then sonicated with deionized water for 5 minutes (power 200 W). After the ultrasound is completed, the treated carbon paper is placed in an evaporating dish and dried at 50° C. for 2 hours. The anion and cation exchange membranes were rinsed with deionized water, and then soaked in deionized water for storage.

(2) Weigh 15 g of sodium chloride (purity 99%), dissolve it in a 1000 ml volumetric flask, and dilute to 1000 ml with deionized water to obtain a 15 g/L sodium chloride solution. Measure 40 ml of sodium chloride solution and pour it into a 50 ml beaker as the intermediate fluid electrolyte of the fluid battery.

(3) Weigh 0.008612 g of positive electrode organic 4-hydroxy-piperidinol oxide (4-Hydroxy-TEMPO, TEMPO, purity 97%), and measure 15 ml of the sodium chloride solution obtained in step (2) with a graduated cylinder, Dissolve the weighed positive electrode organics in the sodium chloride solution and fully dissolve it.

(4) Weigh 0.025718 g of negative electrode organics Riboflavin-5'-phosphate sodium salt dihydrate (FMN-Na), measure 15 ml of sodium chloride solution obtained in step (2) with a graduated cylinder, and weigh A good amount of negative electrode organics is dissolved in sodium chloride solution and fully dissolved.

Figure 1A:
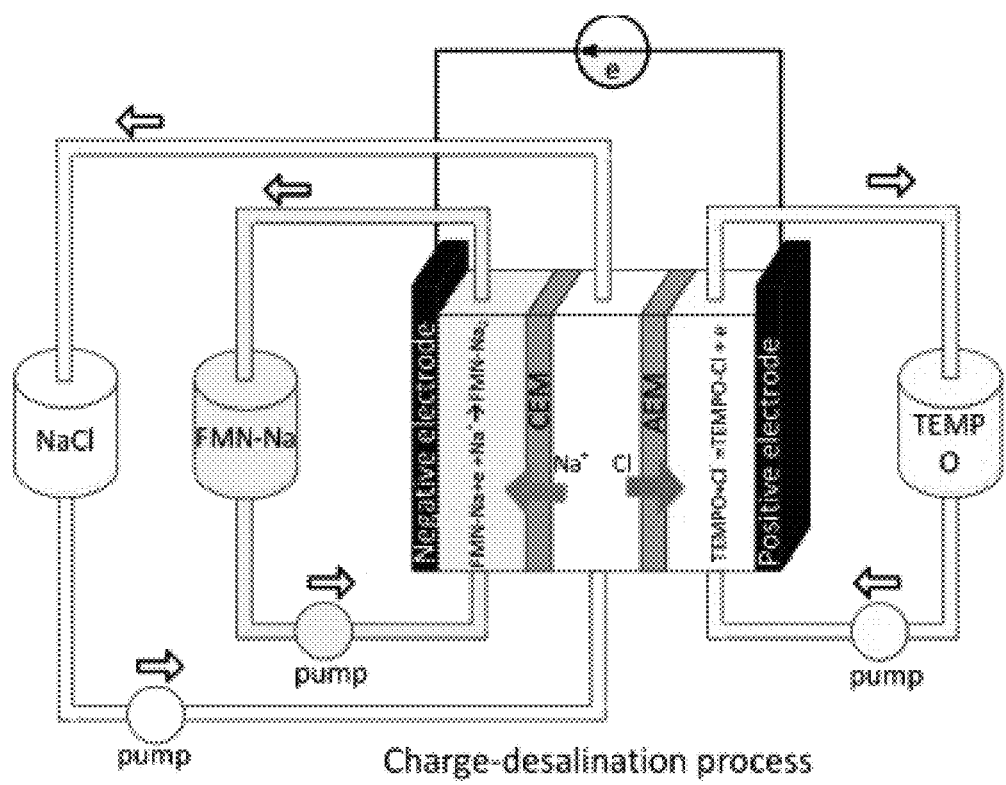
FIGS. 1A-1D show a device for desalination of a fluid battery in Example 1 and its electrochemical performance test diagram.

(5) Build the fluid battery device according to the self-assembly and fixing sequence of the fluid battery device mold:

The fluid battery device mold is a customized mold made of acrylic material. The schematic diagram is shown in FIGS. 1A-IB. Starting from the negative electrode on the left, place mold A, tabs made of carbon cloth, carbon paper processed in step (1), mold B, foamed carbon, cation exchange membrane processed in step (1), mold C, the anion exchange membrane treated in step (1), foamed carbon, mold B, the carbon paper treated in step (1), tab carbon cloth, and mold A. Fix the device with screws, and connect the remaining opening to the peristaltic pump hose through the joint. Then put the inlet hoses of the positive electrode, the negative electrode and the intermediate fluid electrolyte in the peristaltic pump, the inlet and outlet hose ports of the positive electrode are placed in the positive organic substance at the same time, and the inlet and outlet hose ports of the negative electrode are placed in the negative organic substance at the same time. The inlet and outlet hose ports of the intermediate fluid electrolyte are placed in a beaker containing the intermediate fluid electrolyte sodium chloride at the same time. The battery clamps are clamped on the tab carbon cloth according to the positive and negative electrodes, and the carbon cloth is separated by a non-conductive plastic sheet. Place the beaker containing the intermediate fluid electrolyte sodium chloride on the magnetic stirring table, and then put the temperature electrode and the conductivity electrode of the conductivity meter in the beaker.

Figure 1B:
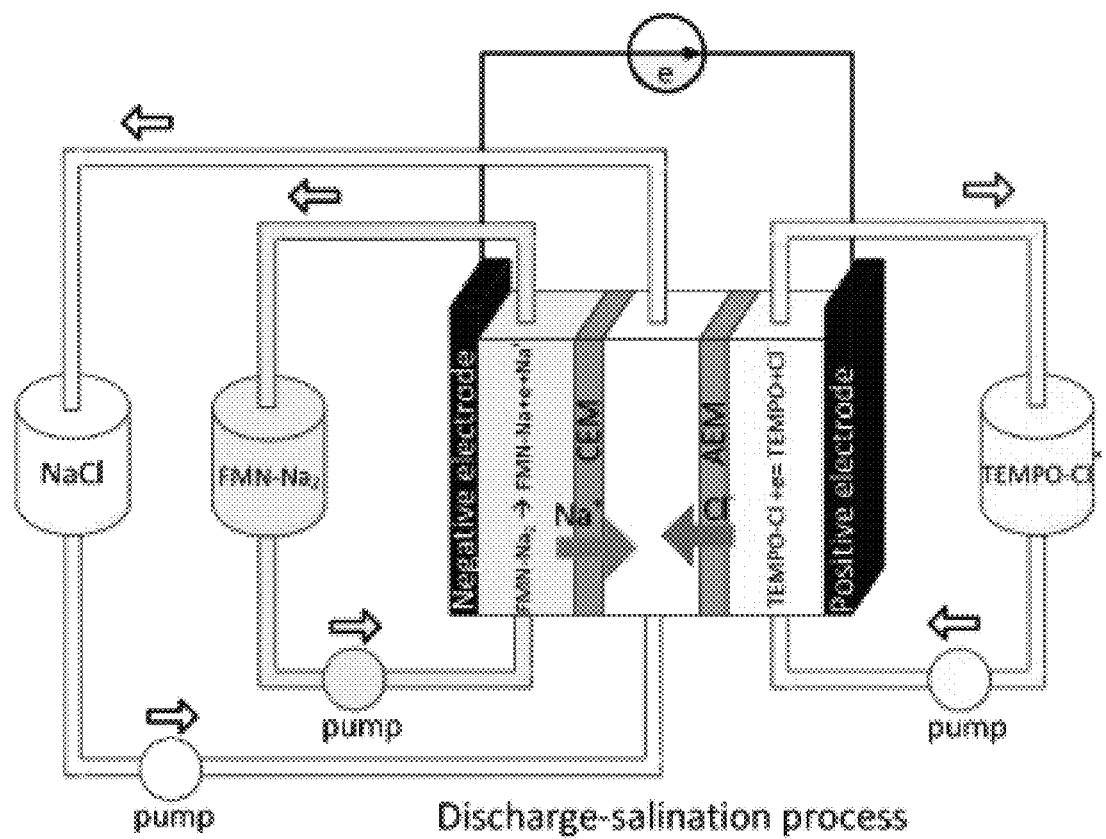

Using the desalination fluid battery built in this experimental example 1, the electrolyte of the fluid battery is circulated through a peristaltic pump, and the concentration change of the intermediate fluid electrolyte is tested by a conductivity meter, thereby testing the desalination capacity of the fluid battery (demineralization fluid The principle of battery desalination is shown in FIGS. 1A-1B. A constant current charge and discharge experiment with 100 mA is used to test the charge and discharge and cycle performance.

Figure 1C:
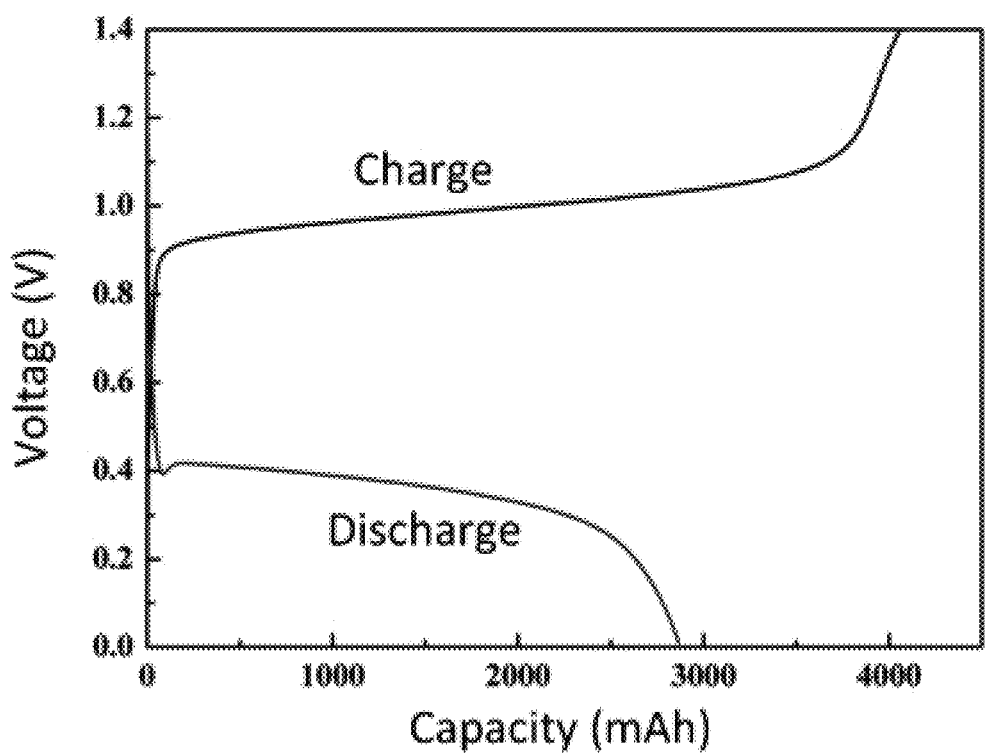
Figure 1D:
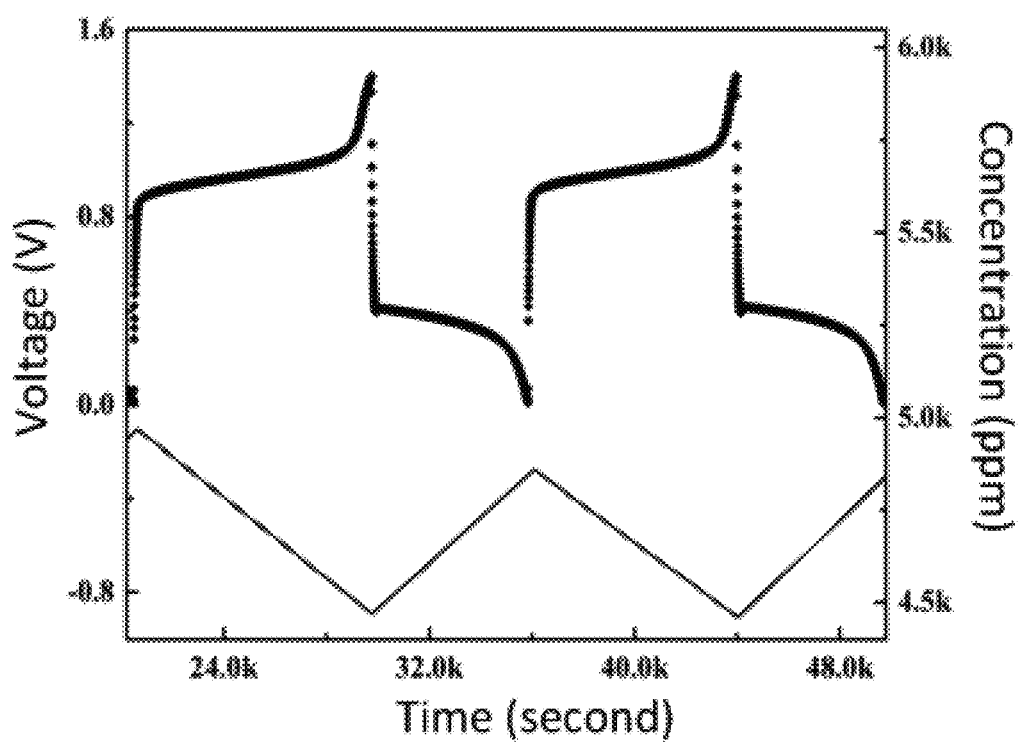

The charge and discharge voltage ranges from 0.01V to 1.40V. Adopted (Shenzhen Xinwei Electronics Co., Ltd.)) The BTS battery test system tests the electrochemical performance of the desalination fluid battery in this experiment under normal temperature conditions. FIG. 1D is the charge and discharge curve of the desalination fluid battery of this example. From FIG. 1C, the specific capacity of the first charge is 3980 mAh/g, the first discharge specific capacity is 2750 mAh/g. After 20 weeks of cycling, the specific capacity remains at 300 mAh/g, and the cycle performance is good. In this example, the conductivity of the intermediate fluid electrolyte NaCl of the invention changes significantly. When it becomes smaller gradually, the electrical conductivity gradually becomes larger when discharging; the electrical conductivity also cycles repeatedly during the charge-discharge cycle, that is, it reflects the salt removal ability of the method of the present invention during charging.

Example 2

A desalination device using a fluid battery to perform low-energy consumption continuous electrochemical oxidation-reduction reactions includes the following aspects: (I) positive and negative electrode materials; (II) electrolyte; (III) fluid equipment; (IV) isolation equipment;

(I) The Preparation of the Positive and Negative Flow Materials of the Desalination Fluid battery device, the specific steps are as follows:

(1) Put 0.01 g of carboxylated carbon nanotubes into a beaker, add 100 ml of deionized water, and perform sonication of 3000 w for 10 mins to obtain mixed solution A;

(2) Add 10 mmol of AgNO3 to the mixed solution A of step (1), stir with a magnet at a speed of 1500 r/min and 0.5 h to obtain a mixed solution B;

(3) Add 400 ml of 0.8 mol/L NaBH4 solution dropwise to the mixed solution B of step (2) through a peristaltic pump; the peristaltic pump speed is: 1 rpm, and after the addition is completed, the speed is 150 r/min, 0.5 h magnetic $\mathcal{f}$ Stirring to obtain a mixed solution C;

(4) Centrifuge the mixed solution C obtained in step (3) with deionized water and absolute ethanol at 8000 r for 15 mins (first centrifuge the mixed solution C, then add ionized water or alcohol and then centrifuge) to obtain Ag particles;

(5) Put 0.01 g of carboxylated carbon nanotubes into a beaker, add 100 ml of deionized water, and perform sonication of 3000 w for 10 mins to obtain a mixed solution D;

(6) Add 10 mmol of AgNO3 to the mixed solution D of step (5), and perform magnetic stirring at a speed of 1500 r/min for 0.5 h to obtain a mixed solution E;

(7) Add 120 ml of 0.8 mol/L NaCl solution dropwise to the mixed solution E of step (6) through a peristaltic pump; the peristaltic pump rate is: 1 rpm, and after the addition is completed, perform a magnetic field with a speed of 150 r/min and 0.5 h. $\mathcal{j}$ Stirring to obtain a mixed solution F;

(8) The mixed solution obtained in step (8) was centrifuged at 8000 r with deionized water and absolute ethanol for 15 minutes to obtain AgCl particles;

(9) Put the Ag particles obtained in step (4), the AgCl particles obtained in step (8), and 1.8 g of activated carbon into a beaker containing 40 ml of deionized water to obtain a mixed solution G;

(10) The mixed solution G obtained in step (9) is subjected to nano ball milling (using a nano ball mill for milling) with a rotation speed of 2000 r and a time of 5 h to obtain a mixed solution H;

(II) The salt solution (electrolyte) of the desalination fluid battery device is a sodium chloride solution, which is prepared by the following method:

(11) Prepare 30 ml of NaCl with a purity of 99.99% into a salt solution with a concentration of 10 g/L, and put it into a 50 ml beaker;

(III) The fluid device is prepared by the following method:

(12) Assemble the fluid battery in the order of assembly (the mold of the fluid battery device is a custom-made mold made of acrylic with stable performance, and the size of the mold is 11×11×1 cm): Use the 30 ml salt solution obtained in step (11) as The intermediate fluid electrolyte is the same as the 10 ml positive and negative flow materials obtained in step (10), graphite paper, anion and cation exchange membranes (anion exchange membranes are anion exchange membranes containing quaternary amine groups and only allow anions to pass through; cation exchange The membrane is a cation exchange membrane containing sulfonic acid groups, and only cations are allowed to pass through) assembled into a desalination fluid battery device, and the fluid battery device is a customized mold. Starting from the negative electrode on the left, place mold A, tabs made of carbon cloth, carbon paper, mold B, and carbon cloth processed in step (1), and cation exchange membrane, carbon cloth, and carbon cloth processed in step (1). Mold C, the anion exchange membrane processed in step (1), mold B, carbon paper processed in step (1), tab carbon cloth, mold A. Fix the device with screws, and connect the remaining openings to the peristaltic pump hose through the joint. Then put the inlet hoses of the positive and negative electrodes and the intermediate fluid electrolyte in the peristaltic pump. The positive and negative materials are the same material. The positive and negative hoses are connected, and the inlet of the positive electrode and the outlet of the negative electrode are placed at the same time. The electrode material, the inlet and outlet hose ports of the intermediate fluid electrolyte are placed in the beaker containing the intermediate fluid electrolyte sodium chloride at the same time. The battery clamps are clamped on the tab carbon cloth according to the positive and negative electrodes, and the carbon cloth is separated by a non-conductive plastic sheet.

Figure 2A:
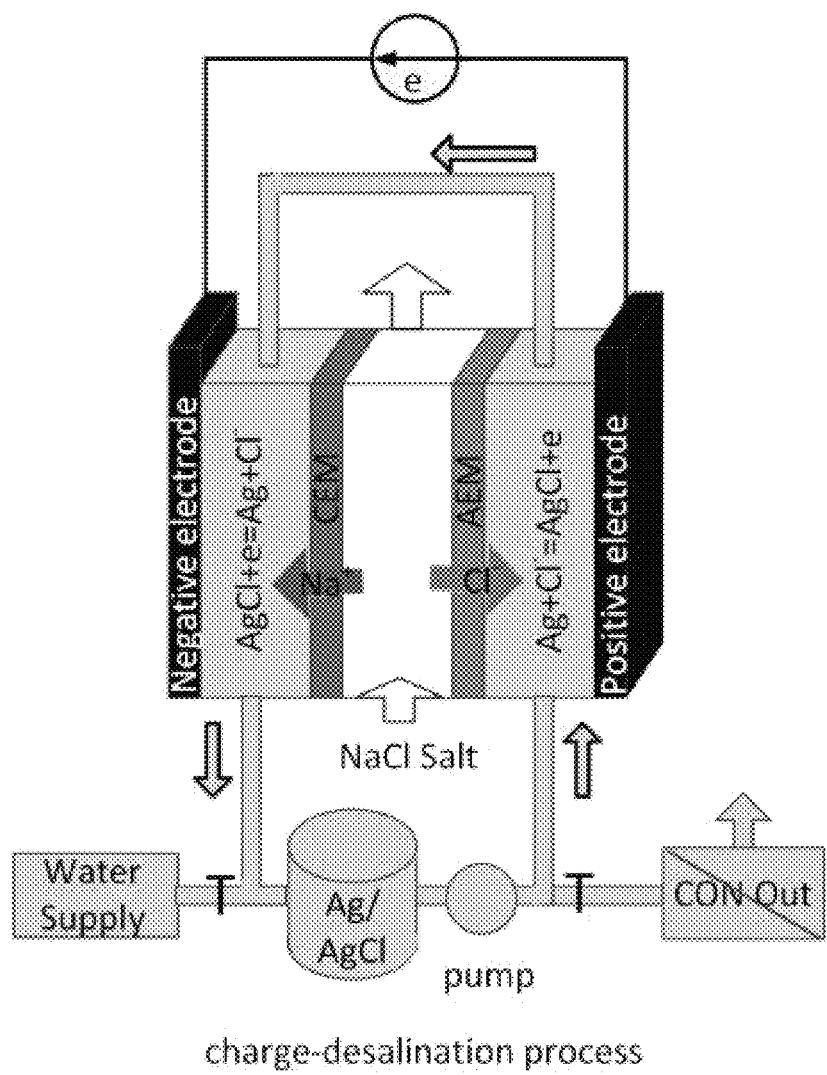
FIGS. 2A-2D are diagrams of a low-energy-consumption continuous desalination device for a fluid battery of Example 2 and its electrochemical performance test diagram.
Figure 2B:
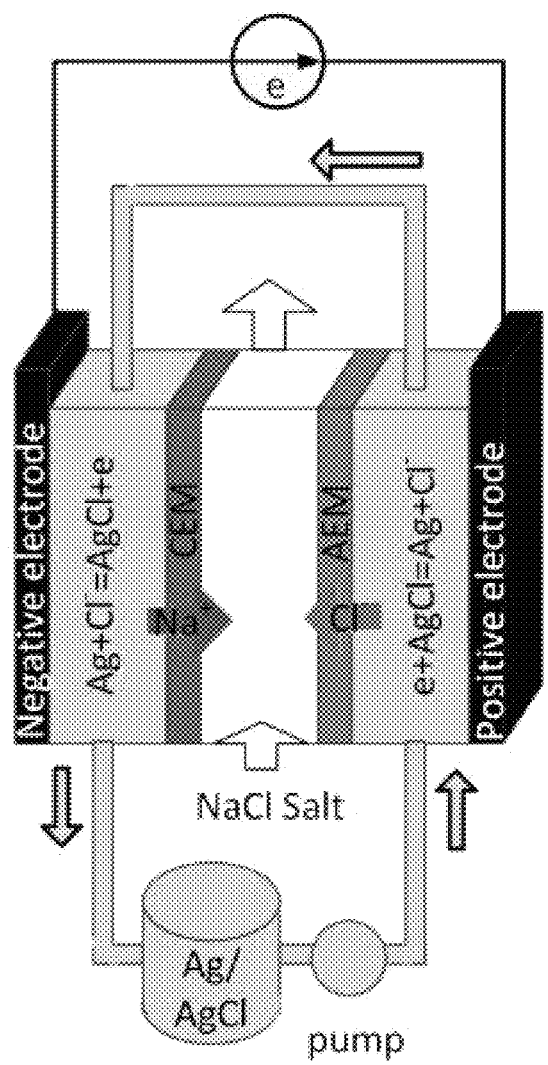

(IV) The described isolation device is realized by the following methods:

(13) In step (12), the NaCl during the charging process of the fluid battery passes through the anion and cation exchange membranes to reach the positive and negative electrodes. The active material is Ag/AgCl mixed solution (as shown in FIG. 2A). The concentration of NaCl in the electrolyte gradually decreases. The NaCl concentration in the positive and negative active flow materials gradually increases; at this time, the NaCl solution in the positive and negative active flow materials is separated by a separator, and clean water flows out from the other end, and the positive and negative materials can also be used. Repeated use, so that the real purpose of desalination can be achieved, as shown in FIG. 2A. FIG. 2B shows the process of discharge salt precipitation.

Figure 2C:
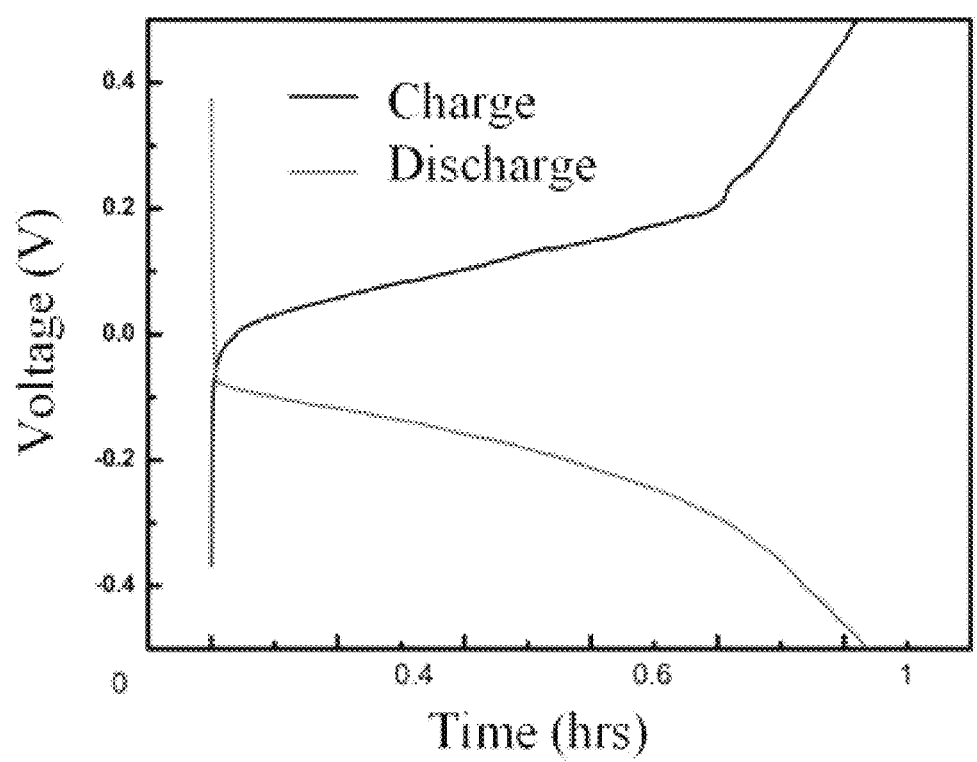
Figure 2D:
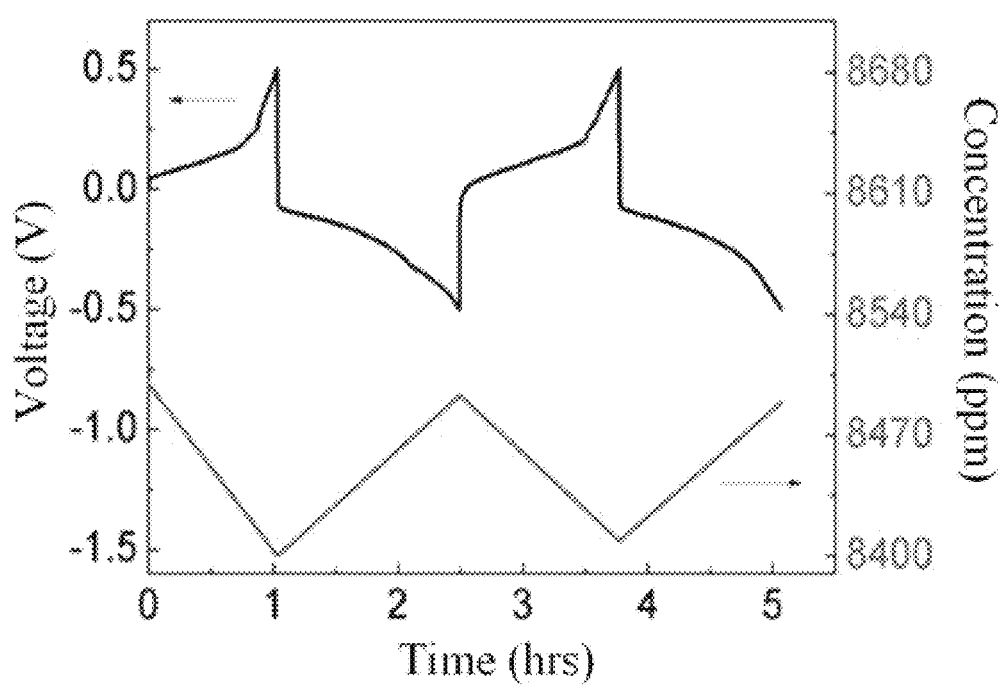

After the fluid battery device is assembled, the positive and negative electrodes are clamped in the tabs (the side close to the anion exchange membrane is connected to the positive electrode, and the side close to the cation exchange membrane is connected to the negative electrode) for electrochemical performance testing. Then use a conductivity meter to test the conductivity of the ions, and then obtain the removal ability of NaCl ions. The change of charging and discharging voltage with time is shown in FIG. 2C, and the detection of real-time conductance is shown in FIG. 2D.

Example 3

A fluid battery device that utilizes light to realize electrical energy conversion in an external circuit and electrochemical catalysis in an internal circuit for continuous desalination includes the following aspects: (1) positive and negative materials; (II) electrolyte; (III) fluid equipment; (IV) Isolation equipment;

(I) The preparation of the positive and negative flow materials of the desalination fluid battery device, the specific steps are as follows:

(1) Add 0.05 g of TEMPO particles and 0.5 g of NaCl particles to 100 mL of deionized water, 3000 w, 10 mins of ultrasound to obtain mixed solution A, which is the positive and negative active flow material;

(II) The salt solution of the desalination fluid battery device is a NaCl solution, which is obtained by the following method:

(2) Prepare 25 ml of NaCl with a purity of 99.99% into a salt solution with a concentration of 8 g/L, and put it into a 50 ml beaker;

(III) The fluid battery equipment is prepared by the following method:

(3) Assemble the fluid battery in the order of assembly (the mold of the fluid battery is a custom-made acrylic mold with very stable performance, the size is 11×11×1 cm): use the 25 mL salt solution in step (2) as the intermediate fluid (fluid Battery electrolyte) and the 50 mL positive and negative flow materials obtained in step (1), graphite paper, conductive glass with photosensitive semiconductor materials, anion and cation exchange membranes (anion exchange membranes are anion exchange membranes containing quaternary amine groups, Only anions are allowed to pass through; the cation exchange membrane is a cation exchange membrane containing sulfonic acid groups, and only cations are allowed to pass) to form a desalination fluid battery device, and the fluid battery device is a customized mold. Starting from the negative electrode on the left, place conductive glass with photosensitive semiconductor material, tabs made of carbon cloth, negative flow material chamber, anion exchange membrane, intermediate salt stream chamber, cation exchange membrane, positive flow material chamber, pre-treated graphite paper, carbon cloth. At this time, use a hose to connect the water outlet of the negative flow material chamber and the water inlet of the positive material chamber with a peristaltic pump hose, and at the same time place the water inlet hose of the negative electrode and the inlet hose of the intermediate salt solution in the peristaltic pump. With the same electrolyte, the positive and the negative electrode chambers are connected, and the negative water inlet hose and the positive water outlet hose are placed in the solution beaker configured in step (1), and the water inlet and outlet of the salt solution are in the middle. The nozzle of the nozzle is placed in the solution beaker in step (2) at the same time, and the water inlet is also connected to the probe of the conductivity meter at the same time. The battery clamp is clamped on the tabs according to the positive and negative poles, and is separated by a plastic sheet in the middle to prevent short circuits.

Figure 3A:
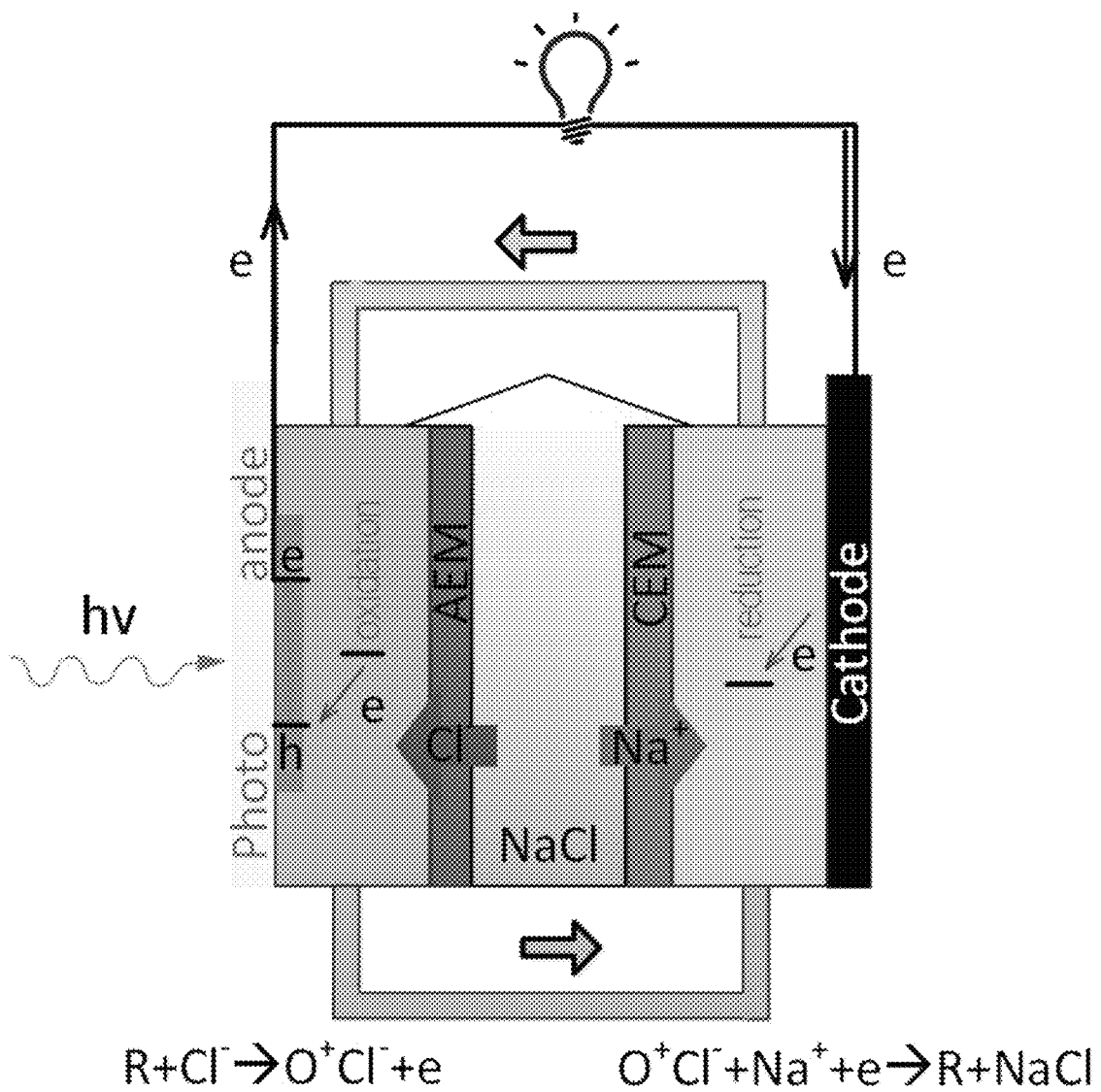
FIGS. 3A-3E show a light-driven electrochemical catalytic continuous desalination device of Example 3 and its electrochemical performance test diagram.
Figure 3B:
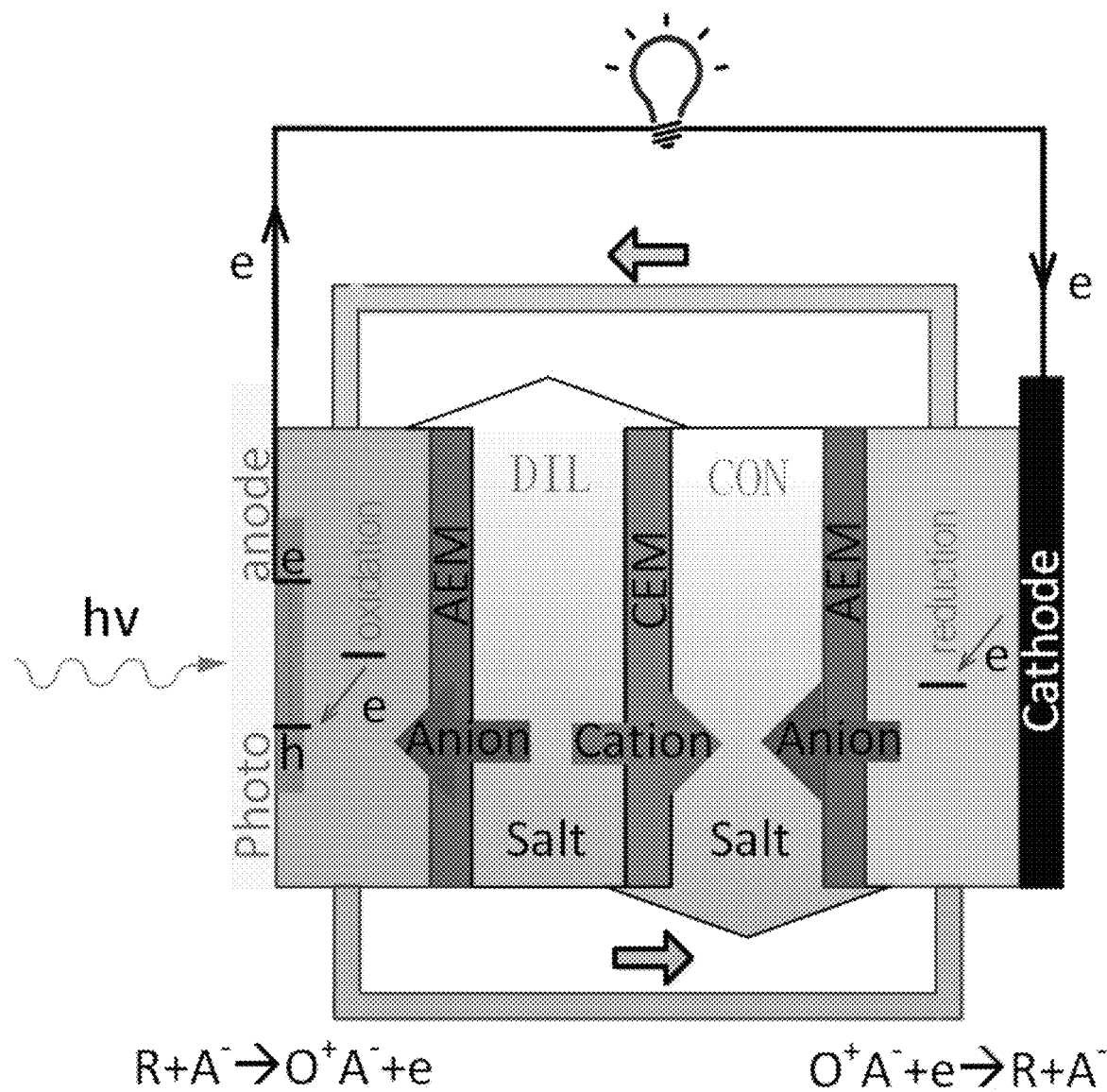
Figure 3C:
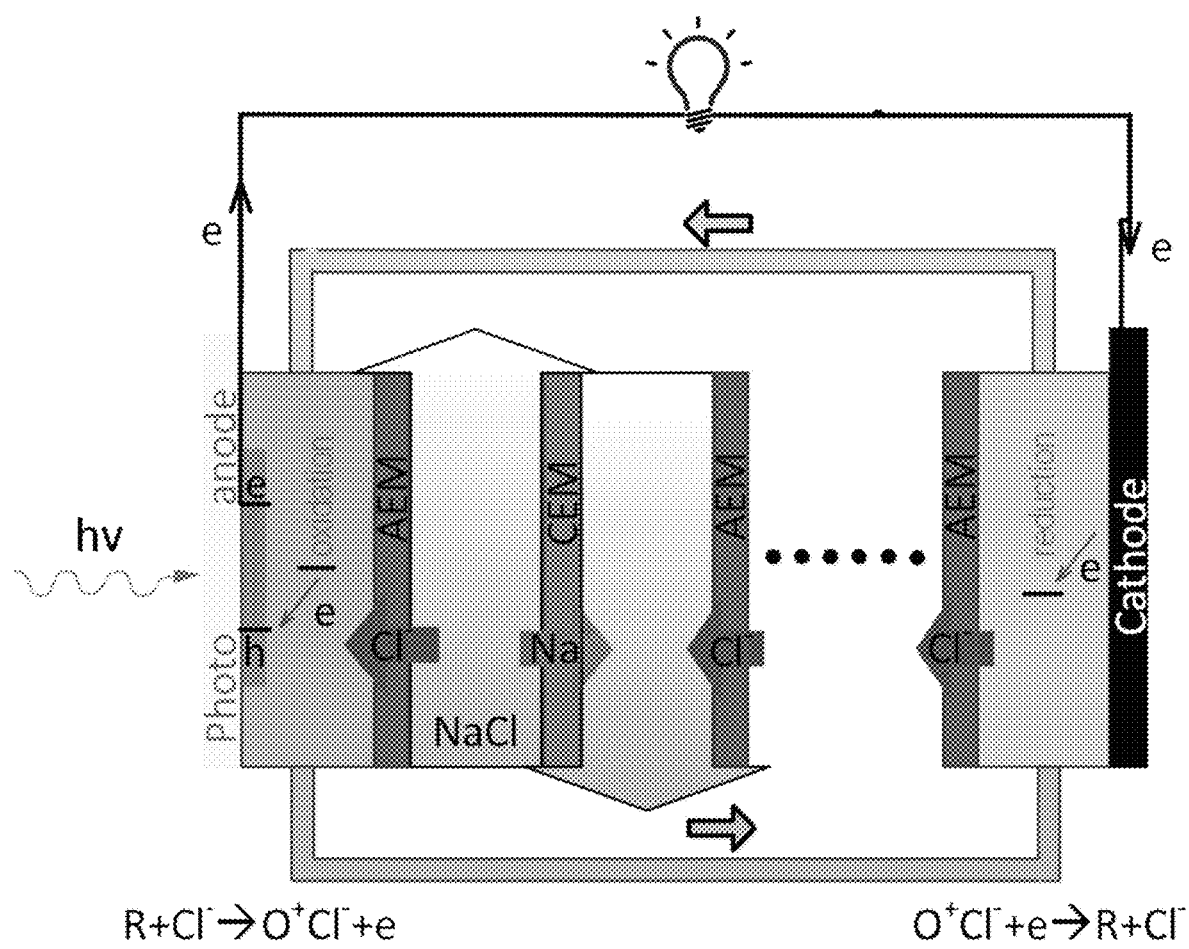

(IV) The described isolation device is realized by the following methods:

(4) In step (3), the NaCl during the discharge process of the flow battery passes through the anion and cation exchange membrane to reach the positive and negative active materials to form a mixed solution. The concentration of NaCl in the electrolyte gradually increases; at this time, the electrode is separated by a separator. The NaCl solution in the active flow material is isolated, and clean water flows out from the other end. The positive and negative materials can be reused, which can achieve the purpose of real desalination, as shown in FIGS. 3A-3C.

Figure 3D:
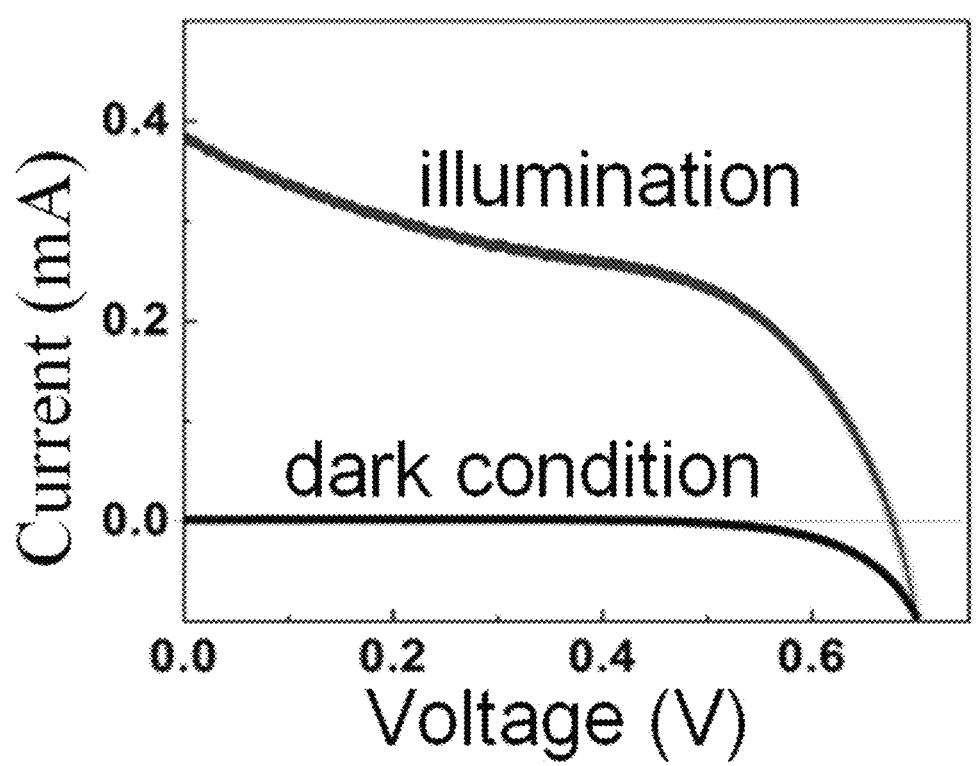

After the flow battery device is assembled, the light source is turned on, and the light source is vertically irradiated on the conductive glass with photosensitive semiconductor material. Clamp the positive and negative electrodes of the electrochemical workstation on the tabs (close to the anion exchange membrane to the negative electrode, and to the cation exchange membrane to the positive electrode) for electrochemical performance testing. Then use the conductivity meter to test the conductivity of the ions, so that the salt removal ability can be tested. FIG. 3D shows the I-V curve of the photosensitive semiconductor material under dark and light conditions. It can be seen that the selected photosensitive semiconductor material can generate a stable and higher current under light conditions and can be used for discharge desalination tests.

Figure 3E:
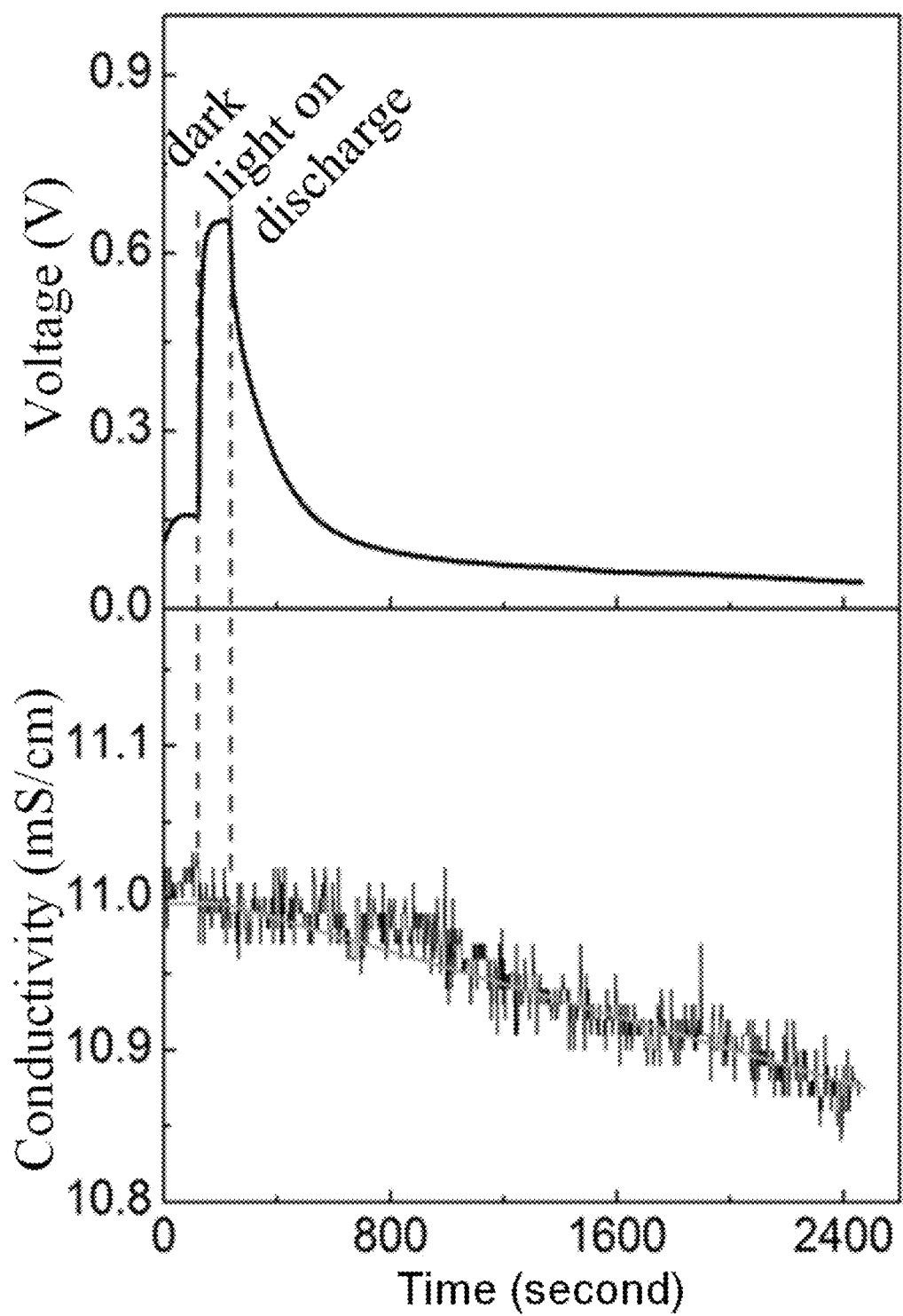

When LEG4 is illuminated, TEMPO molecules undergo redox reactions and are continuously removed from the salt solution. The voltage change of the preliminary test is shown in FIG. 3E: under dark conditions, the open circuit voltage is 0.16V; when illuminated, the open circuit voltage immediately rises to 0.65V; when the cross-current discharge is 0.1 mA, the voltage decreases and maintains, and the salt concentration in the salt solution decreases.

The above-mentioned embodiments are preferred embodiments of the present invention, but the embodiments of the present invention are not limited by the above-mentioned embodiments, and any other changes, modifications, substitutions, combinations, etc. made without departing from the spirit and principle of the present invention Simplified, all should be equivalent replacement methods, and they are all included in the protection scope of the present invention.

What is claimed is:

1. A method for a continuous desalination by a light-driven electrochemical catalysis, wherein
a conductive glass with a photosensitive semiconductor material is configured as a photoelectrochemical catalysis device, and under light conditions, photoelectrons are generated to drive a desalination reaction, continuously desalinating by means of an ion exchange;
positive and negative active materials of a battery comprise one or more than one selected from the group consisting of TEMPO, carbon nanotube-TEMPO, graphene-TEMPO, graphene oxide-TEMPO, polymer-TEMPO, methyl viologen dichloride hydrate, riboflavin-5'-phosphate sodium salt dehydrate, an Ag/AgCl solution, $LiCoO_2$, $LiMn_2O_4$, Bi/BiOCl, Sb/SbOCl, $LiMn_2O_4/NaTi_2(PO_4)_3$, $Zn/VS_2$, $K_{0.27}MnO_2$, $Na_2FeP_2O_7$, $V_2O_5$, $Na_3V_2(PO_4)_3$, $Na_2V_6O_{16}$, $Na_{0.44}MnO_2$, $NaTi_2(PO_4)_3$, PTFE, PBA, $Na_2C_8H_4O_4$, PVA, $Na_{0.44}[Mn_{1-x}Ti_x]O_2$, Bi, $BiF_3$, Pb, $PbF_2$, piperidine inorganic substances, and bipyridinium salts; and
the positive and negative active materials of the battery further comprise one or more than one of polyamide, manganese oxide, and prussian blue $Fe_4[Fe(CN)_6]_3$.

2. The method for the continuous desalination by the light-driven electrochemical catalysis according to claim 1, wherein the photosensitive semiconductor material comprises one selected from the group consisting of dye semiconductors, quantum dot semiconductors, elemental semiconductors, inorganic compound semiconductors, organic compound semiconductors, amorphous semiconductors, and liquid semiconductors.

3. The method for the continuous desalination by the light-driven electrochemical catalysis according to claim 1, wherein the piperidine inorganic substances comprise 2-hydroxypyrimidine; the bipyridinium salts comprise 4'-dipyridinium dichloride.

4. A method for a continuous desalination by a light-driven electrochemical catalysis, wherein
a conductive glass with a photosensitive semiconductor material is configured as a photoelectrochemical catalysis device, and under light conditions, photoelectrons are generated to drive a desalination reaction, continuously desalinating by means of an ion exchange; and
the photosensitive semiconductor material further comprises a two-dimensional semiconductor material, and the two-dimensional semiconductor material comprises $MoS_2$, and $MoSe_2$.

5. A method for a continuous desalination by a light-driven electrochemical catalysis, wherein
a conductive glass with a photosensitive semiconductor material is configured as a photoelectrochemical catalysis device, and under light conditions, photoelectrons are generated to drive a desalination reaction, continuously desalinating by means of an ion exchange; and
a photosensitive semiconductor is one of a solid phase, a liquid phase or a solution phase; materials of the liquid phase or the solution phase comprise one or more than one selected from the group consisting of azure C, thionine, azure A, azure B, and methylene blue.

6. The method for the continuous desalination by the light-driven electrochemical catalysis according to claim 1, wherein the conductive glass is configured as a light window and comprises ITO or FTO; dense layer semiconductor materials is coated on a surface of the conductive glass, dense layer semiconductors comprise $TiO_2$, ZnO, $SrTiO_3$, $Co_3O_4$, CuO, ZnS, SiC, $Cu_2O$, $BaTiO_3$, $Bi_2O_3$, $Sb_2S_3$, ZnSe, $PtTe_2$, $WTe_2$, $MoTe_2$, $SnS_2$, $Bi_4Ti_5O_{12}$, BiOI, $Bi_2WO_6$, $Fe_2O_3$ and $WO_3$.

7. The method for the continuous desalination by the light-driven electrochemical catalysis according to claim 1, wherein the positive and negative active materials further comprise used one or more than one selected from the group consisting of auxiliary conductive additives NaCl, NaF, $Na_2SO_4$, KCl, CNT, GO, activated carbon, conductive carbon materials, ion exchange resins, and insoluble materials.

8. The method for the continuous desalination by the light-driven electrochemical catalysis according to claim 1, wherein the conductive glass with the photosensitive semiconductor material is prepared by the following method:
(a) cleaning an FTO glass;
(b) preparing a transition layer on the FTO glass pretreated in step (a);

(c) mixing and grinding a $TiO_2$ powder, PEG, PEO, acetylacetone and a few drops of Triton X-100 in a mortar, diluting with distilled water, then sonicating and stirring overnight, then coating on the FTO glass with the transition layer obtained in step (b), and finally heating;

(d) putting the FTO glass obtained in step (c) into a $TiO_2$ solution for a treatment, and then heating the treated FTO glass;

(e) dissolving a LEG4 dye in acetonitrile to prepare a dye solution, then putting the FTO glass obtained in step (d) into the dye solution and soaking for 12 to 14 hours, then taking the FTO glass out and cleaning with alcohol to obtain the conductive glass with the photosensitive semiconductor material.

* * * * *